(12) United States Patent
Okamoto et al.

(10) Patent No.: US 9,898,464 B2
(45) Date of Patent: Feb. 20, 2018

(54) INFORMATION EXTRACTION SUPPORTING APPARATUS AND METHOD

(71) Applicant: Kabushiki Kaisha Toshiba, Minato-ku, Tokyo (JP)

(72) Inventors: Masayuki Okamoto, Kawasaki Kanagawa (JP); Yuichi Miyamura, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/946,534

(22) Filed: Nov. 19, 2015

(65) Prior Publication Data

US 2016/0140389 A1 May 19, 2016

(30) Foreign Application Priority Data

Nov. 19, 2014 (JP) .................. 2014-234963

(51) Int. Cl.
 *G06F 17/30* (2006.01)
 *G06F 17/27* (2006.01)
(52) U.S. Cl.
 CPC .... *G06F 17/30011* (2013.01); *G06F 17/2785* (2013.01); *G06F 17/30663* (2013.01)
(58) Field of Classification Search
 None
 See application file for complete search history.

(56) References Cited

U.S. PATENT DOCUMENTS

| | | | |
|---|---|---|---|
| 8,316,001 B1 | 11/2012 | Albrecht et al. | |
| 8,566,360 B2 | 10/2013 | Chen | |
| 8,645,391 B1 * | 2/2014 | Wong | G06F 17/30908 707/748 |
| 2002/0002567 A1 | 1/2002 | Kanie et al. | |
| 2005/0160086 A1 | 7/2005 | Haraguchi et al. | |
| 2005/0251738 A1 | 11/2005 | Hirano et al. | |
| 2009/0077122 A1 * | 3/2009 | Fume | G06F 17/3064 |

(Continued)

FOREIGN PATENT DOCUMENTS

| | | |
|---|---|---|
| JP | H 06-243132 A | 9/1994 |
| JP | H 07-334574 A | 12/1995 |

(Continued)

OTHER PUBLICATIONS

U.S. Appl. No. 15/260,759, filed Sep. 9, 2016, Miyamura et al.

(Continued)

*Primary Examiner* — Bernard Krasnic (74) *Attorney, Agent, or Firm* — Knobbe, Martens, Olson & Bear, LLP (57) ABSTRACT

According to one embodiment, an information extraction supporting apparatus includes a first acquirer, a determiner, a selector and an extractor. The first acquirer acquires a document from which at least one attribute indicating a type of desired information is extracted as an analysis target. The determiner determines whether or not the at least one attribute is valid, and obtains at least one of the valid attributes as one or more attribute candidates. The selector selects an attribute to be used for an analysis from the one or more attribute candidates as a selected attribute. The extractor extracts an expression belonging to the selected attribute from the document as an attribute expression.

13 Claims, 6 Drawing Sheets

(56) References Cited

U.S. PATENT DOCUMENTS

| | | | |
|---|---|---|---|
| 2010/0076991 A1* | 3/2010 | Nakano | G06F 17/30663 707/759 |
| 2012/0030157 A1 | 2/2012 | Tsuchida et al. | |
| 2013/0066912 A1* | 3/2013 | Chetuparambil | G06Q 30/0256 707/776 |
| 2013/0076751 A1 | 3/2013 | Jung et al. | |
| 2013/0179381 A1 | 7/2013 | Kawabata et al. | |
| 2013/0246048 A1 | 9/2013 | Nagase et al. | |
| 2014/0372257 A1 | 12/2014 | Nishioka | |
| 2017/0124067 A1 | 5/2017 | Okamoto et al. | |

FOREIGN PATENT DOCUMENTS

| | | | |
|---|---|---|---|
| JP | H 09-325962 A | 12/1997 | |
| JP | H 11-67576 A | 6/1999 | |
| JP | 2001-134600 A | 5/2001 | |
| JP | 2002-024211 A | 1/2002 | |
| JP | 2002-056354 A | 2/2002 | |
| JP | 2003-044481 A | 2/2003 | |
| JP | 2004-126903 A | 4/2004 | |
| JP | 2005-100082 A | 4/2005 | |
| JP | 2005-190338 A | 7/2005 | |
| JP | 2006-065387 A | 3/2006 | |
| JP | 2010-205218 A | 9/2010 | |
| JP | 2010-218209 A | 9/2010 | |
| JP | 4565106 B2 | 10/2010 | |
| JP | 2011-108085 A | 6/2011 | |
| JP | 2013-073619 A | 4/2013 | |
| JP | 2013-143039 A | 7/2013 | |
| JP | 2013-196374 A | 9/2013 | |
| JP | 5341276 B1 | 11/2013 | |
| JP | 5356197 B2 | 12/2013 | |
| JP | 2014-106611 A | 6/2014 | |
| JP | 2014-137722 A | 7/2014 | |
| JP | 2016-099741 A | 5/2016 | |
| JP | 2017-091000 A | 5/2017 | |
| WO | WO 2010/119615 A1 | 10/2010 | |
| WO | WO 2014/081012 A1 | 5/2014 | |

OTHER PUBLICATIONS

U.S. Appl. No. 15/343,914, filed Nov. 4, 2016, Okamoto et al.
U.S. Appl. No. 15/392,424, filed Dec. 28, 2016, Orihara et al.
U.S. Appl. No. 15/420,834, filed Jan. 31, 2017, Nakata.
Milkov Thomas, et al. "Efficient Estimation of Word Representations in Vector Space", arXiv:1301.3781, Sep. 2013.
Ciravegna, F., "Adaptive Information Extraction from Text by Rule Induction and Generalisation", Proceedings of IJACI-2001.
U.S. Appl. No. 15/689,975, filed Aug. 29, 2017, Okamoto et al.

\* cited by examiner

| | Date | Company 1 | Company 2 | Topic | Relationship |
|---|---|---|---|---|---|
| 305 | Date | Company 1 | Company 2 | Topic | Relationship |
| 306 | 11/11/2014 | Company A | Company B | Semiconductor chip | Tie up |
| | 11/12/2014 | Company C | Company D | Lighting patent | Trial |
| | | | | | |

FIG. 3B

- Constraint in relationship extraction
  — When relationship "Competitive (Company 1, Company 2)" is extracted
  - Company 1 ≠ Company 2
  - "Competitive (Company 1, Company 2) ⇔ Competitive (Company 2, Company 1)"

- Integration of relationship
  — For inclusive relationship
  - "Trial (Company 1, Company 2) ⇒ Competitive (Company 2, Company 1)"
  - "Supply (Company 1, Company 2) ⇒ Cooperative (Company 2, Company 1)"
  — When using knowledge regarding manufacturing industry
    (e.g., relation with components and finished goods)
  - "Manufacturing (Company 1, Component A) ∧ Manufacturing (Company 2, Terminal B)
    ∧ Trading (Company 1, Company 2) ⇒ Supply (Company 1, Company 2)"

Please check output result

| Date | Company 1 | Company 2 | Topic | Relation-ship | Check |
|---|---|---|---|---|---|
| Company A tied up with Company B for Semiconductor chip development (11/11/2014) | | | | | |
| 11/11/2014 | Company A | Company B | Semiconductor chip | Tie up | ○ |
| Company C sued Company D for lighting patent (11/12/2014) | | | | | |
| 11/12/2014 | Company C | Company D | Lighting patent | Supply | × |
| | | | | | |

FIG. 7

Example of searching rule for use in interaction:

(1) Question about (Dated) news
→Read out one news matching "Date =(Date)"

(2) Question about "Competitor of (Company)"
→Read out Company 2 matching "Company 1 = (Company) AND Relationship = Competitive or Company 1 matching "Company 2 = (Company) AND Relationship = Competitive"

FIG. 8

INFORMATION EXTRACTION SUPPORTING APPARATUS AND METHOD

CROSS-REFERENCE TO RELATED APPLICATIONS

This application is based upon and claims the benefit of priority from Japanese Patent Application No. 2014-234963, filed Nov. 19, 2014, the entire contents of which are incorporated herein by reference.

FIELD

Embodiments described herein relate generally to an information extraction supporting apparatus and method.

BACKGROUND

The technique to extract information such as an attribute of a word (for example, product name and price of the product) from a web page or a document has been known. With such a technique, particular information within a document can be easily organized (for example, extracting the list of specifications of products from a document and making a table).

However, if information to be extracted varies for each document, it is troublesome to select an attribute. The conventional technique to classify plural documents into designated categories and to determine what kind of information is to be extracted in accordance with the classification may be used.

DETAILED DESCRIPTION

If a person who extracts information (an analyst) is not well trained or not an expert, there may be a problem that the person cannot recognize what kind of attribute should be extracted depending on the purpose. In particular, if an attribute to be extracted varies depending on a combination of features, it is difficult for a person who is not an expert to consider the relationship between a document and features. In addition, if the number of documents increases, the amount of information that must be extracted increases, and the analyst's share to check also increases.

In general, according to one embodiment, an information extraction supporting apparatus includes a first acquirer, a determiner, a selector and an extractor. The first acquirer acquires a document from which at least one attribute indicating a type of desired information is extract as an analysis target. The determiner determines whether or not the at least one attribute is valid, and obtains at least one of the valid attributes as one or more attribute candidates. The selector selects an attribute to be used for an analysis from the one or more attribute candidates as a selected attribute. The extractor extracts an expression belonging to the selected attribute from the document as an attribute expression.

Hereinafter, an information extraction supporting apparatus, method, and program according to the present embodiments will be described in detail with reference to the drawings. In the following embodiments, elements which perform the same operation will be assigned the same reference symbols, and redundant explanations thereof will be omitted as appropriate.

First Embodiment

Figure 1:
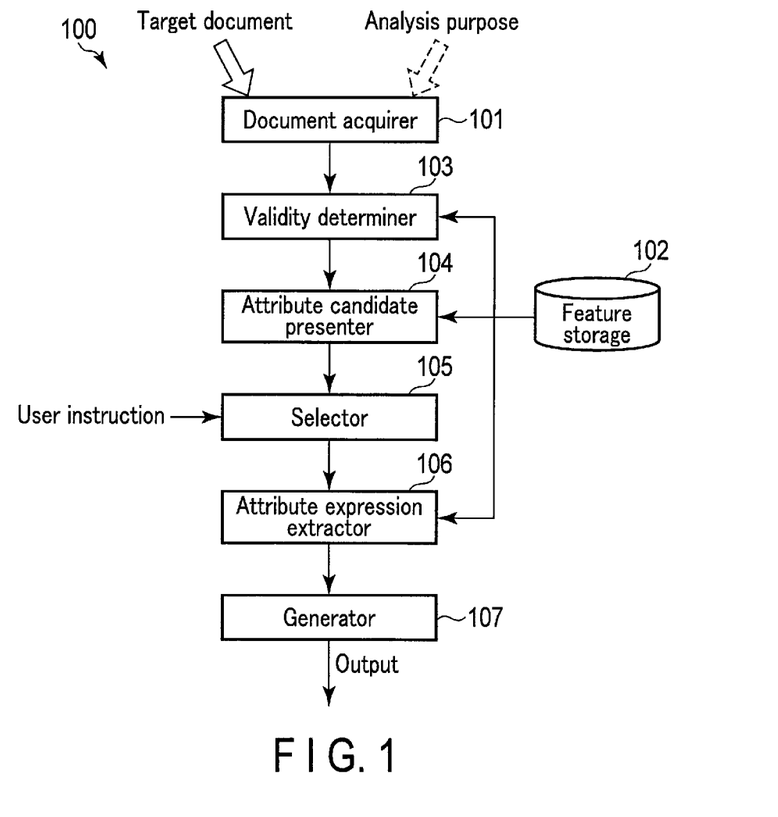
FIG. 1 is a block diagram showing an information extraction supporting apparatus according to a first embodiment.

An information extraction supporting apparatus according to the first embodiment will be described with reference to the block diagram of FIG. 1.

The information extraction supporting apparatus 100 according to the first embodiment includes a document acquirer 101, a feature storage 102, a validity determiner 103, an attribute candidate presenter 104, a selector 105, an attribute expression extractor 106, and a generator 107.

The document acquirer 101 acquires one or more target documents to be analyzed. The target document may be acquired by a user input, or may be automatically collected by an external server. In the present embodiment, it is assumed that the target document is text data expressed by natural writing such as a web page and a news article uploaded on the Internet, for example. However, the target document is not limited there to, and may be anything in which an attribute can be extracted from data. The attribute indicates a type of desired information that a user wishes to extract, for example, a product name, price, and a company name. The document acquirer 101 may acquire a purpose of analysis (hereinafter also referred to as "analysis purpose") from a user. The analysis purpose may be, for example, a technical map, a supply chain, or a family tree, but is not limited thereto.

The feature storage 102 stores a table in which wording including words and phrases, and an attribute of the wording are associated with each other, a feature extractor, and one or more logic rules. The feature extractor extracts metadata of a document used for extracting an attribute to extract an attribute expression explained later (for example, time and date of creation, file format of document, language, etc.), features of wording included in the document (for example, a part of speech such as nouns and verbs, classification of proper nouns such as personal names and place names, wordings appearing before or after a word, N-grams, etc.), and features of drawings included in the document (classification of drawings, pictures, graphs, and illustrations, the number of columns or rows in a table, etc.). The logic rule is a rule relating to the relationships between attributes used for extracting the attribute expression explained later. The feature extractor and the attribute which is to be an extraction candidate have a multiple-to-one relationship or a one-to-multiple relationship. In other words, one or more feature extractors correspond to one attribute, or a feature extractor corresponds to one or more attributes. The relationship between the feature extractor and the attribute may be pre-stored or selected based on the extraction results. The logic rule will be described later with reference to FIG. 4. The feature storage 102 stores an analysis purpose and corresponding attributes which are expected for the analysis purpose. The analysis purpose and the attributes are associated with each other.

The validity determiner 103 receives one or more target documents from the document acquirer 101, and determines whether or not an attribute that can be extracted from the one or more target documents is valid for an analysis purpose by referring to the feature storage 102. The validity determiner 103 obtains one or more attributes that are determined as valid as one or more attribute candidates.

If the document acquirer 101 does not acquire an analysis purpose, the validity determiner 103 may estimate an analysis purpose by referring to at least one of the target document and the attribute candidate. In this case, the validity determiner 103 may estimate the category and the document format of one or more target documents.

The attribute candidate presenter 104 acquires one or more attribute candidates and one or more target documents from the validity determiner 103, and presents the one or more attribute candidates on a display, for example.

The selector 105 receives an instruction from a user (hereinafter referred to as "user instruction"), and one or more attribute candidates and one or more target documents from the attribute candidate presenter 104. The selector 105 selects an attribute to be used for analysis selected by the user instruction from among the attribute candidates presented by the attribute candidate presenter 104 as a selected attribute.

The attribute expression extractor 106 receives the selected attribute and one or more target documents from the selector 105, and extracts an expression belonging to the selected attribute from the one or more target documents as an attribute expression for each selected attribute.

The generator 107 receives the selected attribute, corresponding attribute expression, and the one or more target documents from the attribute expression extractor 106. The generator 107 performs analysis processing including setting an output format for the selected attribute and the attribute expression that the user desires in accordance with the analysis purpose, and generates an analysis result. The analysis result is output to a display, for example. The generator 107 may set the output format by receiving the user instruction including information indicating the output format. Otherwise, a particular output format may be preset as a default setting.

Figure 2:
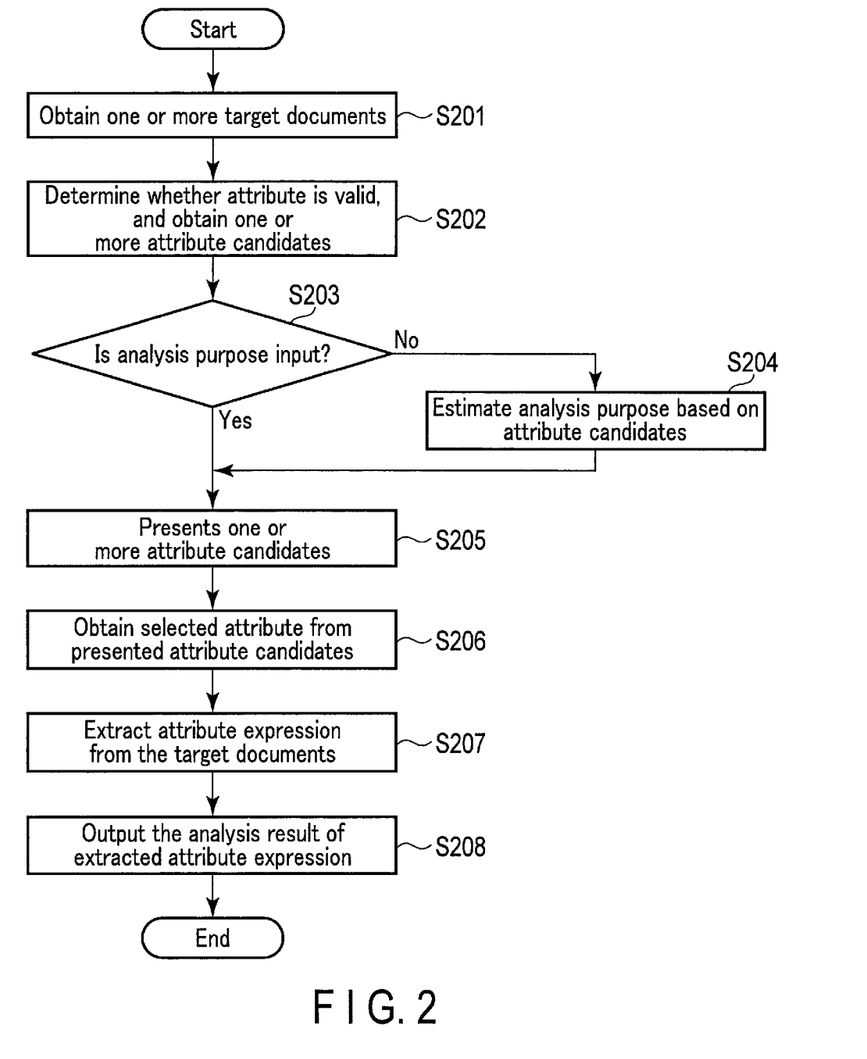
FIG. 2 is a flowchart showing the information extraction processing of an information extraction device.

Next, an information extraction process at the information extraction supporting apparatus 100 will be explained with reference to the flowchart of FIG. 2.

In step S201, the document acquirer 101 obtains one or more target documents.

In step S202, the validity determiner 103 determines whether or not an attribute that can be extracted from the one or more target documents is valid.

For example, if the number of times a wording appears that belongs to a particular attribute included in the one or more target documents is not less than a threshold, the attribute may be determined as valid. Specifically, if it is determined by a proper expression extraction method that the number of times that a term "A Corporation" appears in the target documents is not less than the threshold, an attribute "company name" that the term "A Corporation" belongs to is determined as a valid attribute.

A wording and an attribute of the wording may be determined by referring to a lookup table indicating the correspondences between wordings and attributes stored in the feature storage 102, or by referring to external information regarding the correspondences between wordings and attributes. Otherwise, the correspondences between a wording and an attribute may be determined based on the number of times that the wording is extracted by the feature extractor stored in the feature storage 102 for the corresponding attribute. For the determination, all of the input documents may be used, or a specific number of documents sufficient for determination that are randomly sampled may be used.

Also, if the number of times that a plurality of wordings appear that belong to a particular attribute included in the one or more target documents is not less than a threshold, the attribute may be determined as valid. Specifically, if the total number of times that terms "A Corporation", "B Corporation" "and C Corporation" indicating company names appear in the target documents is not less than the threshold, an attribute "company name" that each of the terms belongs to is determined as a valid attribute.

The validity determiner 103 obtains an attribute that is determined as valid among attributes that can be extracted as an attribute candidate.

In step S203, the validity determiner 103 determines whether or not an analysis purpose is input by a user. Inputting the analysis purpose first can decrease the time for estimating an attribute required for the analysis purpose. If the analysis purpose is input, the process proceeds to step S205; if not input, the process proceeds to step S204.

In step S204, the validity determiner 103 estimates one or more analysis purposes by referring to at least one of the target documents and the attribute candidates. For example, if a news article including numerous terms indicating "company name" is obtained as a target document, the validity determiner 103 may estimate analysis purposes relating to company names, e.g., analysis representing the relationships between companies, such as "technology map", "industry map", "supply chain", and "stock price comparison". The user selects a desired analysis purpose from among the estimated analysis purposes.

In step S205, the attribute candidate presenter 104 presents one or more attribute candidates. The attribute candidate presenter 104 may present preselected attribute candidates that are expected to be required in accordance with the analysis purpose as "recommended" attributes.

The attributes may be presented as a list in which attributes are arranged in alphabetical order, by sorting the list based on the frequency of attribute appearance, or by grouping attributes having close relationships such as a product name and a product classification. In addition, the grouped attributes may be collapsed or expanded in the list format. The attribute candidate presenter 104 may present the attribute selected when the same type of document was analyzed before by using the information extraction supporting apparatus 100. By the aforementioned presentation of attributes, the user does not have to check all of the large number of attribute candidates when selecting the attributes necessary for analysis.

In step S206, the selector 105 selects an attribute to be used for analysis selected by the user instruction from among the presented attribute candidates as a selected attribute. Examples of user instructions include a user touching an area of a display in which attribute candidates are displayed, a user inputting attribute candidates by means of an input device such as a keyboard, and a user reading out attribute candidate names and determining attribute candidates by a general speech recognition processing.

In step S207, the attribute expression extractor 106 extracts expressions belonging to the selected attribute as attribute expressions from the one or more target documents in accordance with the feature extractor and the logic rule in the feature storage 102. In the case where the feature extractor and the logic rule are not used, the attribute and expressions in the target documents are associated with each other when the processing of the validity determiner 103 is completed. In this case, the attribute expression extractor 106 may obtain the expressions associated with the attribute as attribute expressions without performing another processing.

In step S208, the generator 107 generates and outputs an analysis result regarding the selected attribute and extracted attribute expressions.

The information extraction processing of the information extraction supporting apparatus 100 is completed by the above procedures. In this embodiment, it is assumed that all of the one or more target documents obtained by the document acquirer 101 are processed at one time. However, the information extraction processing shown in FIG. 2 (such as the processing at the validity determiner 103) may be performed for each of the target documents. For example, if a new target document is added, the validity determiner 103 may perform the processing only for the added target document, and determine whether or not an attribute that can be extracted from the added target document is valid.

An example of an attribute expression extracted from a target document will be explained with reference to FIG. 3A.

For example, if the relationships between companies are analyzed based on the news article regarding company activities, it is required to extract information regarding the company activities from the article (including the title of the article).

Figure 3A:
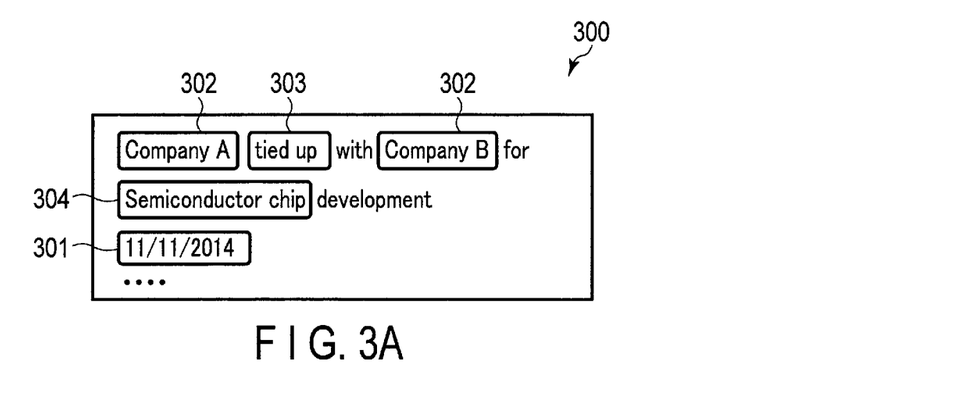
FIG. 3A illustrates an example of an attribute expression extracted from a target document.

As shown in FIG. 3A, the title of article 300 includes a date 301 of "Nov. 1, 2014", companies "Company A" and "Company B", a relationship between companies 303 such as "tied up", and a topic 304 such as "Semiconductor chip" as article contents. The attribute expression extractor 106 extracts these terms as attribute expressions.

Figure 3B:
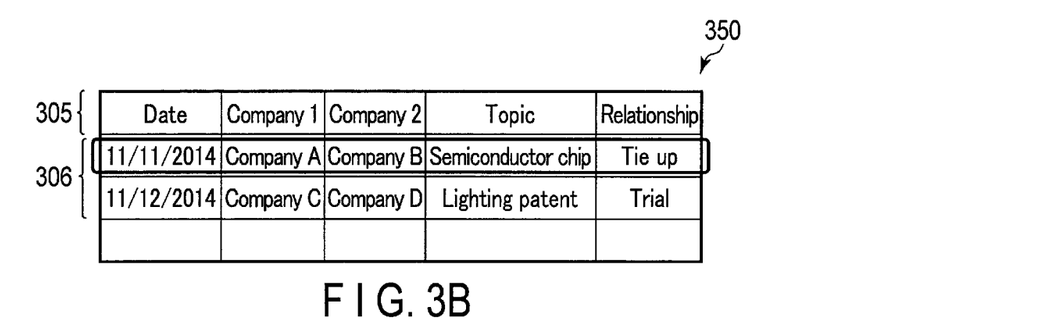
FIG. 3B illustrates an example of a table showing analysis results of the target document.

An example table showing analysis results of the target document is shown in FIG. 3A with reference to FIG. 3B.

Table 350 shows the relationships between attributes and attribute expressions. In the table output as the analysis results, attributes 305 which are column headings are associated with attribute expressions 306.

For example, if a list of companies is created, only attributes relating to "Company" may be extracted. If the relationships between companies are analyzed, attributes relating to "Company" and "Relationship" may be extracted.

When extracting company names, the general natural language processing such as a proper expression extraction can be used. However, for a new company name which is not included in a dictionary, the company name, "ABC", is estimated based on the context, such as "tied up with ABC". Company names themselves or clues for finding a company name from a context may be prepared in the feature storage 102 as a library, and the library may be used in accordance with the type of document to be analyzed.

There is a case where attribute expressions for some of the attributes required for an analysis purpose cannot be extracted all at once, depending on the type of the document. In such a case, columns for an attribute for which corresponding attribute expressions cannot be extracted may be blank, or may be complemented by another means. For example, if an attribute expression belonging to a certain attribute commonly belongs to an attribute for which a corresponding attribute expression is blank, such blank may be compensated for by the stored attribute expression of the certain attribute. Otherwise, attribute expressions that cannot be extracted may be compensated for by searching using an external search engine with an already extracted attribute expression as a search query.

In addition, knowledge of an expert for analysis processing may be applied by using the logic rule. An example of the logic rule stored in the feature storage 102 will be explained with reference to FIG. 4.

Figure 4:
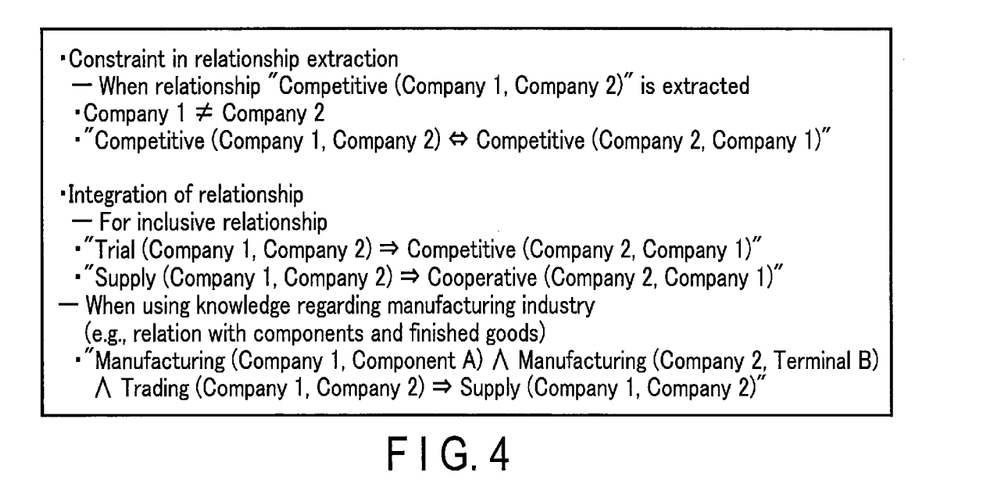
FIG. 4 illustrates an example of a logic rule stored in a feature storage.

For example, if the competitive relationship between "Company A" and "Company B" is represented as "Competitive (Company A, Company B)", and the representation order of companies does not change the meaning, a rule of "Competitive (Company 1, Company 2) ⇔ Competitive (Company 2, Company 1)" is used since "competitive (Company 1, Company 2)" is equal to "Competitive (Company 2, Company 1)". This can avoid extracting redundant attribute expressions, and avoid redundant expressions in the analysis processing and the result output in the post-processing.

It is assumed that companies in the midst of a legal dispute are competitors. For these companies, the rule of "Trial (Company 1, Company 2) ∧ Competitive (Company 2, Company 1)" is used to apply relationships between multiple types of attributes.

If company 1 manufactures a component A, company 2 manufactures a final product B, and companies 1 and 2 have a business relationship with each other, a supply relationship is established. In this case, the rule of Manufacturing (Company 1, Component A) ∧ Manufacturing (Company 2, Terminal B) ∧ Trading (Company 1, Company 2) ⇒ Supply (Company 1, Company 2)" is used so as to describe a part of a supply chain.

By referring to such logic rules, the relationships between attributes that an expert can analyze may be obtained or analyzed even if a user does not have sufficient knowledge for analysis.

A user may select a logic rule from among multiple logic rules presented to the user. For example, the attribute candidate presenter 104 obtains one or more logic rules from the feature storage 102, and presents the one or more obtained rules to the user, and the selector 105 selects a logic rule in accordance with a user instruction. By doing so, the attribute expression extractor 106, which is a post-processing format, can perform extraction of attribute expressions based on the user's intention. In addition, the selector 105 may select a necessary attribute for the logic rule selected in accordance with the user instruction as a selected attribute, and the attribute candidate presenter 104 may present the selected attribute.

Similarly, the user may select a feature extractor from among feature extractors presented to the user. For example, the attribute candidate presenter 104 obtains one or more feature extractors from the feature storage 102, and presents the one or more obtained feature extractors to the user, and the selector 105 selects a feature extractor in accordance with a user instruction. By doing so, the attribute expression extractor 106, which is a post-processing format, can perform extraction of attribute expressions based on the user's intention. In addition, the selector 105 may select a necessary attribute for the feature extractor selected in accordance with the user instruction as a selected attribute, and the attribute candidate presenter 104 may present the selected attribute.

An example of presentation by the attribute candidate presenter 104 and an example of output of the analysis result generated at the generator 107 will be explained with reference to FIG. 5.

The attribute candidate presenter 104 presents a window in which a user inputs a target document, and the user selects an analysis purpose. FIG. 5(a) illustrates the case where the user selects "supply chain" as an analysis purpose, and selects an article regarding the semiconductor field as a target document.

The analysis purpose may be selected from among predetermined items. Otherwise, as stated in the above step S204, after the document acquirer 101 obtains a target document, a possible analysis purpose may be estimated based on words included in the target document, and may present the estimated analysis purpose.

It is also possible for the user to input an analysis purpose. If the user freely inputs an analysis purpose, the analysis purpose should be one of analysis purposes preset in the information extraction supporting apparatus 100. Accordingly, an assistant technique for text input such as an incremental search may be used to present a preset analysis purpose in response to the user's input of several characters.

Figure 5:
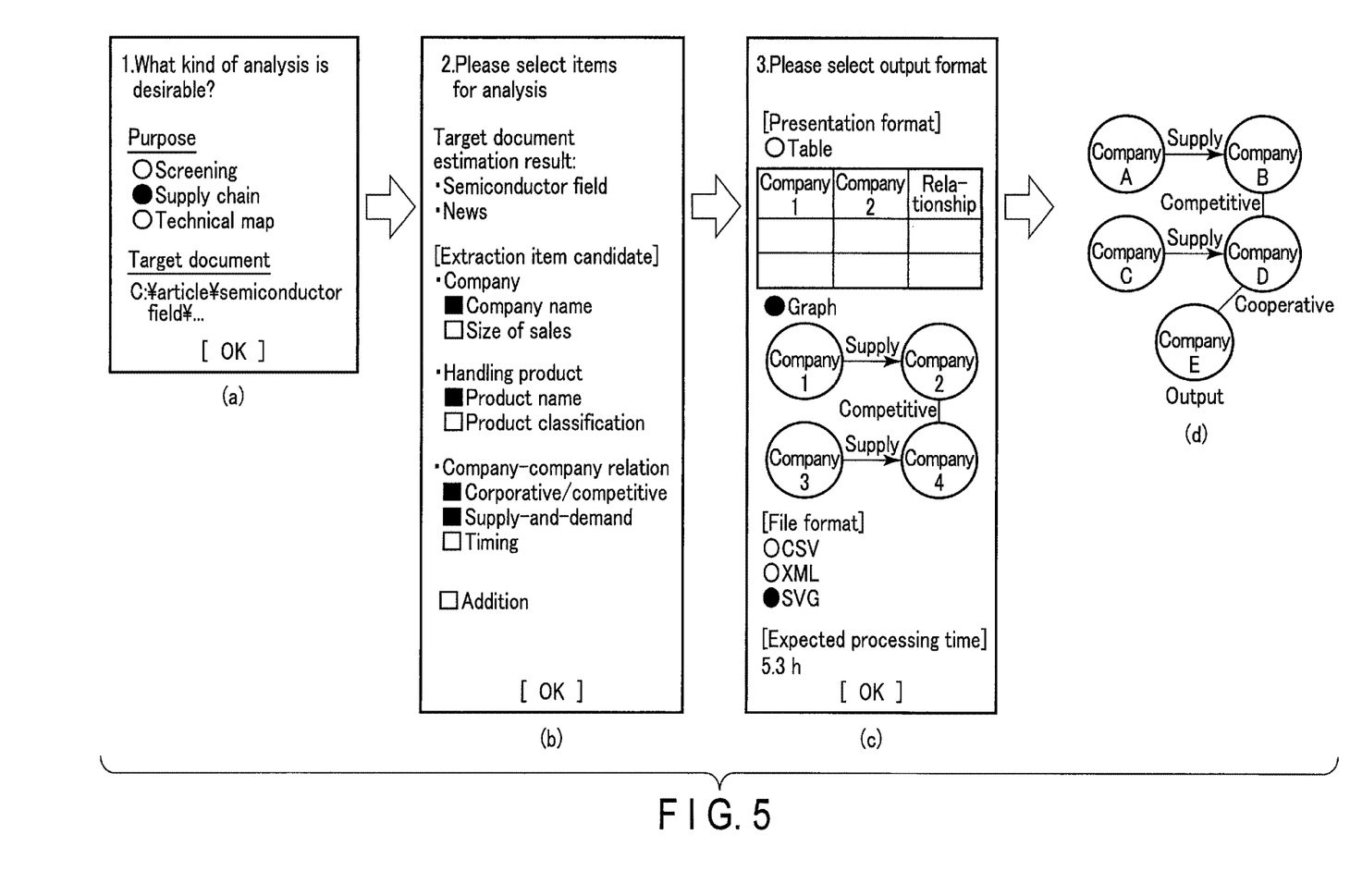
FIG. 5 illustrates a example of presentation of the analysis results generated at an attribute candidate presenter and a generator.

FIG. 5(b) illustrates the estimation results of the target document and attribute candidates presented by the attribute candidate presenter 104. In this example, since the analysis purpose has been already input, attributes preset as those to be used for the analysis purpose are predefined and presented as recommended attributes under the extraction item candidates. An attribute that should be used for the analysis purpose, but is not included in the target document, may not be presented. The attributes may be presented as unselectable to indicate that the attributes are necessary for analysis purposes.

In addition, an additional attribute that the user considers as necessary for the analysis can be selected, and an attribute that the user considers as unnecessary for the analysis can be unselected. Features indicating content of the target document, the field of the target document, and the type of the target document, such as an article or a thesis, may be presented in order to make the analysis result easily understandable to the user. In FIG. 5(b), "semiconductor field" and "news" are presented. If there is another attribute to be extracted, an attribute can be added as a new item. In FIG. 5(b), the selected items are selected attributes.

In FIG. 5(c), "presentation format" to select an output format of attributes and attribute expressions, "file format" to select a file format to be output, and "expected processing time" to indicate an estimated time required for analysis are displayed. For example, there are cases where it is desirable that the attribute and attribute expressions are output as a table, and that they are output as a graph if attributes are not independent but are correlated. Accordingly, it is desirable that the user can select an output format. There may be a case where the generator 107 preselects a suitable presentation format in accordance with the analysis purpose, and the analysis result is presented to the user as the selected presentation format.

If the results are output as an electronic file, a file format may be selectable. If the user decides that the time required for analysis is too long by referring to the expected processing time, the user may narrow down attributes to be extracted (unselect attributes that the user considers unnecessary) to adjust the processing time.

FIG. 5(d) illustrates the results of analysis executed by the generator. FIG. 5(d) is an example in which the supply chain relationship between companies is output as a graph format.

According to the first embodiment described above, it is assumed whether or not attributes that can be extracted from target documents are valid, and what kind of attributes that can be extracted can be presented in accordance with the user's analysis purpose. Attribute expressions are extracted based on the selected attributes, and the analysis results using the attribute expressions are output as a table or a graph so as to facilitate analysis including necessary information.

In addition, necessary attributes are preselected in accordance with the logic rule including analysis points that an expert uses so as to facilitate analysis including necessary information in accordance with the analysis purpose even for a person who is not an expert.

Second Embodiment

The second embodiment is different from the first embodiment in that a user provides correct or incorrect determinations to the attributes and the output results so that machine learning is established. There are cases where the analysis results cannot be utilized as they are; for example, the cases where the analysis results should be reviewed or a feedback should be made to improve the extract accuracy of the information extraction supporting apparatus 100. In such cases, the accuracy of extraction of attribute candidates and analysis results can be improved by establishing machine learning.

Figure 6:
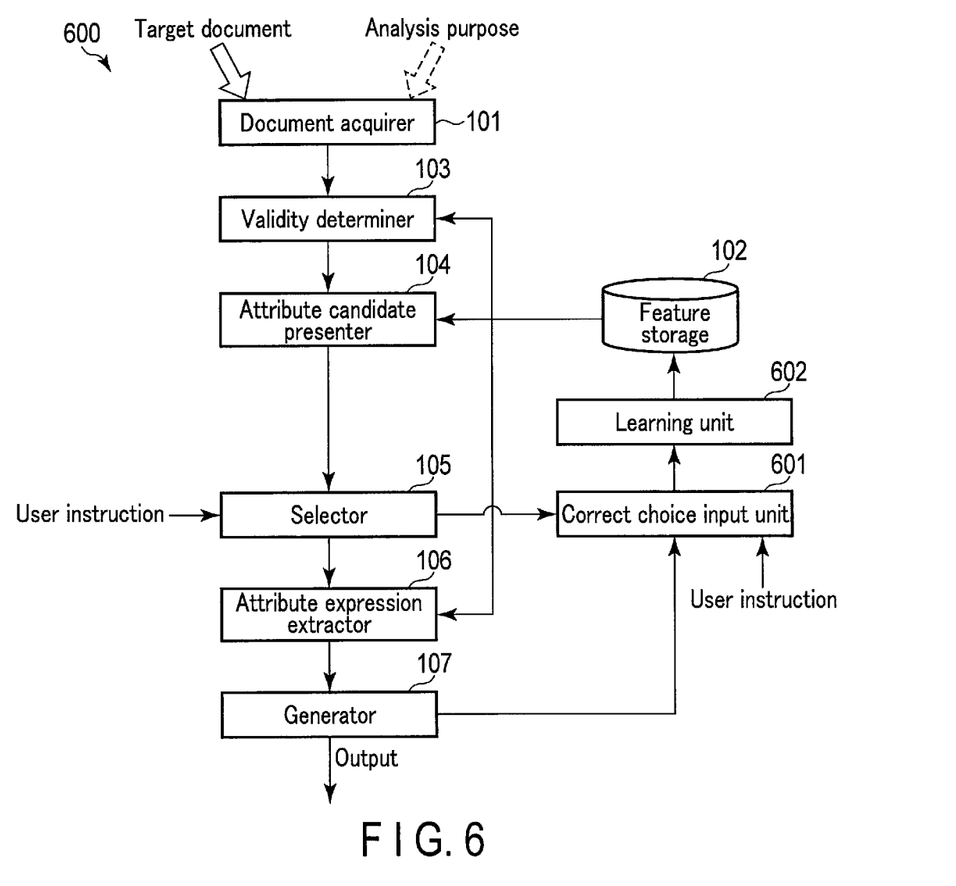
FIG. 6 is a block diagram showing an information extraction supporting apparatus according to a second embodiment.

The information extraction supporting apparatus 600 according to the second embodiment includes a document acquirer 101, a feature storage 102, a validity determiner 103, an attribute candidate presenter 104, a selector 105, an attribute expression extractor 106, a generator 107, a correct choice input unit 601, and a learning unit 602.

The document acquirer 101, the feature storage 102, the validity determiner 103, the attribute candidate presenter 104, the selector 105, the attribute expression extractor 106, and the generator 107 perform the same operations those in the first embodiment, and accordingly, the explanations thereof will be omitted.

The correct choice input unit 601 receives attribute candidates from the selector 105 and output results from the generator 107, and performs a correct or incorrect determination for each attribute candidate and output result, based on the user instruction.

The learning unit 602 receives from the correct choice input unit 601 the attribute candidates and the analysis results to which the correct or incorrect determination has been performed by the user, and updates data including the logic rules stored in the feature storage 102.

An example of a user interface window by which the output results can be reviewed will be explained with reference to FIG. 7.

Figure 7:
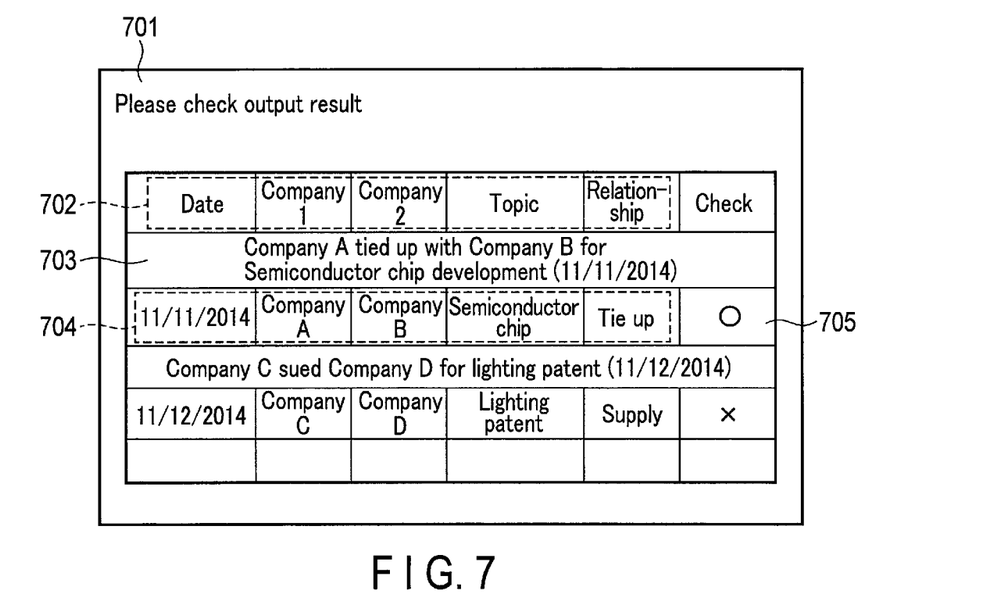
FIG. 7 illustrates an example of a user interface.

FIG. 7 illustrates an example that the target document and the extraction results are output to the user. For example, a message 701, "please confirm the output result", is displayed to prompt the user to perform correct or incorrect determination. In FIG. 7, attributes 702, "data", "Company 1", "Company 2", "Topic" and "Relationship" are presented, as well as original text 703 of the target document, and attribute expressions 704 corresponding to each attribute 702 extracted from the original text 703. If necessary, scores such as the certainty factor or the probability value attached to the output results by the information extraction supporting apparatus 100 may be presented as well as attributes 702. In addition, the feature extractor or logic rule used for extracting the corresponding attribute expressions 704, or application results of the feature extractor or logic rule may be presented to indicate how the extraction results are obtained based on what kind of clue.

Furthermore, as shown in FIG. 7, check column 705 to which indicates whether or not a correspondence between an attribute and an attribute expression is correct or incorrect, may be presented. The user inputs "○" if all of the correspondences between the attributes and attribute expressions are correct, and inputs "×" if there is an error in the extraction results. The correct choice input unit 601 receives the correct or incorrect determination results for each attribute and attribute expression from the user. The learning unit 602 updates data stored in the feature storage 102 based on the correct or incorrect determination results of the user. A general learning method may be applied in that the priority of correspondence between an attribute and an attribute expression determined as correct is set to be higher, and an attribute expression determined as incorrect is not presented the next and subsequent times. In this case, the number of times that the feature extractors and logic rules are used for extracting the attribute expression 704 is counted so that the feature extractors and logic rules to be used for extraction of each attribute can be sorted, or weighting can be computed for each feature extractor or logic rule. During the next time of processing execution, the time required for processing can be reduced, and the accuracy of analysis can be improved by preventing the implementation of unnecessary feature extractors or logic rules.

For example, for the original text 703, "Company A tied up with Company B for Semiconductor chip development (Nov. 11, 2014)", "○" is input in the check column 705. It shows that the user has determined that the correspondences between these attributes and attribute expressions are correct. Accordingly, the learning unit 602 stores the correspondences into the feature storage 102 (or updates the stored data).

On the other hand, for the original text 703, "Company C sued Company D for lighting patent (Nov. 12, 2014)", "×" is input in the check column 705. It shows that the user has determined that the correspondences between these attributes and attribute expressions are incorrect. For the original text 703, "Company C sued company D for lighting patent (Nov. 12, 2014)", the attribute expression 704 for the attribute 702, "Relationship", is "Supply". However, in consideration of the expression "sued" in the original text, the attribute expression 704 should be "Trial". Then, the learning unit 602 may cause the feature storage 102 to learn this error (update data). In this way, the accuracy of extraction of attribute candidates and analysis results can be improved.

In the example of FIG. 7, the correctness is determined based on the correspondences for all the attributes, but may be determined based on the correspondence for each attribute. For example, "×" may be input only for the attribute expression 704, "Supply", of which the correspondence with the attribute is incorrect so that a more detailed determination result can be provided.

In addition, information extracted by the aforementioned method as analysis results may be used as a dictionary or a knowledge source, or may be applied for another purpose. An example of updating a logic rule will be explained with reference to FIG. 8.

Figure 8:
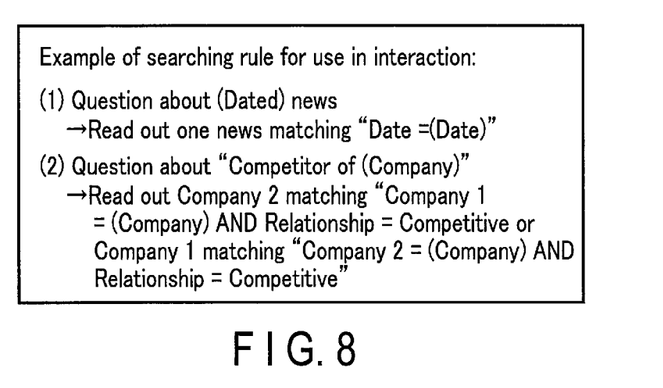
FIG. 8 illustrates an example of update of a logic rule.

FIG. 8 shows an example of how to use the knowledge obtained in the form of the logic rule as shown in FIG. 4 in an interaction such as a speech interaction that includes a question and an answer that requires background knowledge.

For example, if a question regarding a news event that occurred on a particular day is entered, a rule is provided in which an attribute of "Date", which is the same attribute expression as the input date, is read out from a news article that is an original text. Specifically, a speech recognition unit (not shown in the drawings) recognizes a speech from a user, for example. The attribute expression extractor 106 then extracts, in response to the speech recognition result, a news article that is an original text from which an attribute expression, which is the same as the input date, was extracted from the target document. Then, a speech synthesis unit (not shown in the drawings) receives the news article extracted from the attribute expression extractor 106, and performs speech synthesis to read out the article.

If a question about a competitor of a certain company is input, a company that is competing with "Company 1" or "Company 2" is searched for, and the name of the queried company is returned as a response. The knowledge to deal with an inquiry is not limited to news articles; such knowledge may also be built by dividing and storing questions and answers within the response records obtained, for example, in a call center. By designating attributes used for questions and answers, the obtained data can be utilized as a knowledge base for interaction.

According to the second embodiment, machine learning is established by receiving the correct or incorrect determination results regarding the presented attribute candidates and analysis results from the user so that the accuracy of extraction of attribute candidates and analysis results can be improved.

The flow charts of the embodiments illustrate methods and systems according to the embodiments. It is to be understood that the embodiments described herein can be implemented by hardware, circuit, software, firmware, middleware, microcode, or any combination thereof. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information extraction supporting apparatus, comprising:
a computer system implemented in computer hardware and configured to implement computer instructions, the computer system comprising:
a first acquirer which acquires a document from which at least one attribute indicating a type of desired information is extracted as an analysis target;
a determiner which determines whether or not the at least one attribute is valid, and obtains at least one of the valid attributes as one or more attribute candidates;
a selector which selects an attribute to be used for an analysis from the one or more attribute candidates as a selected attribute;
an extractor which extracts an expression belonging to the selected attribute from the document as an attribute expression, and when a second attribute for which an attribute expression is not extracted among third attributes required for the purpose of the analysis is present and when an attribute expression belonging to other third attributes commonly belongs to the second attribute, uses the attribute expression belonging to the other third attributes as an attribute expression of the second attribute;
a second acquirer which acquires a correct or incorrect determination for the one or more attribute candidates; and
a learning unit which executes learning based on the correct or incorrect determination.

2. The apparatus according to claim 1, wherein the first acquirer acquires a purpose of the analysis.

3. The apparatus according to claim 1, wherein the determiner estimates a purpose of the analysis by referring to at least one of the document and the attribute candidates.

4. The apparatus according to claim 1, wherein the determiner determines a first attribute as valid when a number of appearances of a wording belonging to a first attribute within the document is not less than a first threshold or a total number of appearances of a plurality of wordings belonging to the first attribute within the document is not less than the first threshold.

5. The apparatus according to claim 1, wherein the determiner estimates a category and a document format of the document.

6. The apparatus according to claim 1, wherein when a new document is added, the determiner determines whether or not the attribute is valid for the new document, or whether or not the attribute is valid for all of the documents.

7. The apparatus according to claim 1, further comprising a presenter which presents the attribute candidates.

8. The apparatus according to claim 7, wherein the determiner estimates an attribute candidate required for a purpose of the analysis, and the presenter presents the attribute candidate required for the purpose of the analysis as being preselected.

9. The apparatus according to claim 7, wherein the presenter presents an estimated time required for the analysis.

10. The apparatus according to claim 1, further comprising a storage which stores at least one of a feature extractor and a logic rule, the feature extractor being used for extracting the attribute expression, the logic rule indicating a relationship between attributes.

11. The apparatus according to claim 10, wherein the selector selects at least one of the feature extractor or the logic rule in accordance with a user instruction.

12. The apparatus according to claim 10, wherein when at least one of the feature extractor and the logic rule is selected by a user, the selector selects, as the selected attribute, an attribute required for the selected feature extractor or the selected logic rule.

13. An information extraction supporting apparatus, comprising:
a computer system implemented in computer hardware and configured to implement computer instructions, the computer system comprising:
a first acquirer which acquires a document from which at least one attribute indicating a type of desired information is extracted as an analysis target;
a determiner which determines whether or not the at least one attribute is valid, and obtains at least one of the valid attributes as one or more attribute candidates;
a selector which selects an attribute to be used for an analysis from the one or more attribute candidates as a selected attribute;
an extractor which extracts an expression belonging to the selected attribute from the document as an attribute expression, and when a second attribute for which an attribute expression is not extracted among third attributes required for a purpose of the analysis is present and when an attribute expression belonging to other third attributes commonly belongs to the second attribute, uses the attribute expression belonging to the other third attributes as an attribute expression of the second attribute;
a generator which generates an analysis result in accordance with the purpose of the analysis;
a second acquirer which acquires, from a user, a correct or incorrect determination for at least one of the one or more attribute candidates and the analysis result; and
a learning unit which executes learning based on the correct or incorrect determination,
wherein the analysis includes a setting of an output format of the selected attribute and the attribute expression.

* * * * *